United States Patent
Tanaka et al.

(10) Patent No.: US 10,451,722 B2
(45) Date of Patent: Oct. 22, 2019

(54) IN-VEHICLE OBJECT DETERMINING APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Hidenori Tanaka, Kariya (JP); Akihiro Kida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 355 days.

(21) Appl. No.: 15/520,323

(22) PCT Filed: Oct. 21, 2015

(86) PCT No.: PCT/JP2015/005303
§ 371 (c)(1),
(2) Date: Apr. 19, 2017

(87) PCT Pub. No.: WO2016/063532
PCT Pub. Date: Apr. 28, 2016

(65) Prior Publication Data
US 2017/0322299 A1 Nov. 9, 2017

(30) Foreign Application Priority Data

Oct. 22, 2014 (JP) ................ 2014-215713

(51) Int. Cl.
G01S 13/56 (2006.01)
G08G 1/16 (2006.01)
(Continued)

(52) U.S. Cl.
CPC .............. *G01S 13/56* (2013.01); *B60R 21/00* (2013.01); *B60R 21/0134* (2013.01); *G01S 7/527* (2013.01); *G01S 7/539* (2013.01); *G01S 13/931* (2013.01); *G01S 15/52* (2013.01); *G01S 15/582* (2013.01); *G01S 15/876* (2013.01); *G01S 15/93* (2013.01); *G01S 15/931* (2013.01); *G08G 1/16* (2013.01); *G08G 1/165* (2013.01); *G08G 1/166* (2013.01); *G01S 2015/933* (2013.01)

(58) Field of Classification Search
None
See application file for complete search history.

(56) References Cited

U.S. PATENT DOCUMENTS 6,269,308 B1 * 7/2001 Kodaka ................. G01S 13/931
340/435
7,142,150 B2 * 11/2006 Thackray ................. G01S 7/41
342/54

(Continued)

FOREIGN PATENT DOCUMENTS

| JP | 2013-020458 A | 1/2013 |
| WO | 2016/063534 A1 | 4/2016 |
| WO | 2016/063535 A1 | 4/2016 |

*Primary Examiner* — Bernarr E Gregory
(74) *Attorney, Agent, or Firm* — Knobbe, Martens, Olson & Bear, LLP

(57) ABSTRACT

An in-vehicle object determining apparatus cooperates with an obstacle sensor unit, which detects an obstacle at a first time. An estimated detected state is calculated as a detected state of the obstacle estimated to be detected by the obstacle sensor unit at a second time after a lapse of a predetermined time period from the first time, on condition that the obstacle is assumed to be under stationary state, based on (i) a vehicle-relative position of the obstacle detected at the first time, (ii) a sensor position of the obstacle sensor unit, and (iii) a vehicle position change during a period from the first time to the second time. It is determined that the obstacle is a moving object based on a discrepancy between the estimated detected state of the obstacle and a real detected state of the obstacle actually detected by the obstacle sensor unit at the second time.

8 Claims, 8 Drawing Sheets

(51) Int. Cl.
*G01S 15/93* (2006.01)
*G01S 13/93* (2006.01)
*G01S 15/87* (2006.01)
*G01S 15/58* (2006.01)
*G01S 7/539* (2006.01)
*G01S 7/527* (2006.01)
*B60R 21/0134* (2006.01)
*B60R 21/00* (2006.01)
*G01S 15/52* (2006.01)
*G01S 13/00* (2006.01)
*G01S 15/00* (2006.01)

(56) References Cited

U.S. PATENT DOCUMENTS

| | | | | |
|---|---|---|---|---|
| 7,209,833 B2 * | 4/2007 | Isaji | ............... | G08G 1/166 340/436 |
| 7,418,346 B2 * | 8/2008 | Breed | ............... | G08G 1/167 701/117 |
| 7,489,266 B2 * | 2/2009 | Ohtake | ............... | G01S 13/931 342/107 |
| 7,957,901 B2 * | 6/2011 | Shin | ............... | G01S 15/93 367/118 |
| 8,862,291 B2 * | 10/2014 | Sharma | ............... | G08G 1/167 246/122 R |
| 9,031,743 B2 * | 5/2015 | Okita | ............... | G08G 1/166 701/41 |
| 9,524,643 B2 * | 12/2016 | Goerick | ............... | G08G 1/166 |
| 2002/0177953 A1 * | 11/2002 | Okamura | ............... | G08G 1/166 701/301 |
| 2005/0090983 A1 * | 4/2005 | Isaji | ............... | G08G 1/166 701/301 |
| 2006/0111842 A1 * | 5/2006 | Sugimoto | ............... | G08G 1/166 701/301 |
| 2008/0189040 A1 * | 8/2008 | Nasu | ............... | G08G 1/163 701/301 |
| 2008/0300787 A1 * | 12/2008 | Zeng | ............... | G01S 13/931 701/301 |
| 2010/0030426 A1 | 2/2010 | Okita | | |

* cited by examiner

IN-VEHICLE OBJECT DETERMINING APPARATUS

CROSS REFERENCE TO RELATED APPLICATION

The present application is based on Japanese Patent Application No. 2014-215713 filed on Oct. 22, 2014, the disclosure of which is incorporated herein by reference.

TECHNICAL FIELD

The present disclosure relates to an in-vehicle object determining apparatus that determines whether an object around a vehicle is a moving object.

BACKGROUND ART

There is conventionally known a technique which determines whether an obstacle detected using an obstacle sensor such as a laser radar and an ultrasonic sensor is a moving object. Patent Literature 1 discloses an in-vehicle object determining apparatus that determines whether an object lateral to a vehicle is a moving object using ultrasonic sensors.

The in-vehicle object determining apparatus disclosed in Patent Literature 1 compares to each other the waveforms of ranging data sequentially obtained with the movement of the vehicle by the ultrasonic sensors which are arranged in an anterior position and a posterior position on a side surface of the vehicle, thus determining whether a detected obstacle is a moving object.

PRIOR ART LITERATURES

Patent Literature

Patent Literature 1: JP 2013-020458 A

SUMMARY OF INVENTION

However, the in-vehicle object determining apparatus disclosed in Patent Literature 1 determines whether the obstacle detected by the obstacle sensors is a moving object using the waveforms of the ranging data obtained with the movement of the vehicle. This leads to an issue in that, when the vehicle is at a stop, whether the obstacle detected by the obstacle sensors is a moving object cannot be determined.

It is an object of the present disclosure to provide an in-vehicle object determining apparatus which allows whether the obstacle detected by an obstacle sensor is a moving object to be determined irrespective of whether a vehicle is traveling or at a stop.

According to an example of the present disclosure, an in-vehicle object determining apparatus mounted in a vehicle operates in association with an obstacle sensor unit. The in-vehicle object determining apparatus is provided to include a determination section, an obstacle position specification section, a sensor position storing element, a vehicle position change specification section, and a detected state estimation section. The obstacle sensor unit sequentially detects presence of an obstacle around the vehicle and a distance to the obstacle. The determination section determines whether an obstacle detected by the obstacle sensor unit is a moving object. The obstacle position specification section specifies a vehicle-relative position of the obstacle detected by the obstacle sensor unit. The sensor position storing element stores a sensor position as a position of the obstacle sensor unit relative to the vehicle. The vehicle position change specification section specifies a vehicle position change that is a change in a position of the vehicle. The detected state estimation section calculates, based on (i) the vehicle-relative position of the obstacle specified by the obstacle position specification section, (ii) the sensor position stored in the sensor position storing element, and (iii) the vehicle position change specified by the vehicle position change specification section, the vehicle position change being during a period from a first time when the obstacle is detected by the obstacle sensor unit to a second time after a lapse of a predetermined time period from the first time, an estimated detected state as a detected state of the obstacle estimated to be detected by the obstacle sensor unit at the second time on condition that the obstacle is assumed to be under stationary state. The determination section determines that the obstacle is a moving object based on a discrepancy between the estimated detected state of the obstacle calculated by the detected state estimation section and a real detected state of the obstacle actually detected by the obstacle sensor unit at the second time.

In the in-vehicle object determining apparatus, the determination section determines that the obstacle is a moving object based on a discrepancy between the detected state of the obstacle at a predetermined time, which is estimated by the detected state estimation section and a real detected state of the obstacle by the obstacle sensor unit.

Based on the vehicle-relative position of the obstacle detected by the obstacle sensor unit, the sensor position as the position of the obstacle sensor unit relative to the vehicle, and the vehicle position change during a period from the detection of the obstacle by the obstacle sensor unit to the predetermined time (second time), the detected state of the obstacle estimated to be detected by the obstacle sensor unit at the predetermined time on condition that the obstacle is assumed to be under stationary state can be estimated irrespective of whether the vehicle is traveling or at a stop. Therefore, irrespective of whether the vehicle is traveling or at a stop, the detected state estimation section can estimate the detected state of the obstacle estimated to be detected by the obstacle sensor unit at the predetermined time on condition that the obstacle is assumed to be under stationary state. If there is a discrepancy between the detected state of the obstacle estimated to be detected by the obstacle sensor unit at the predetermined time on condition that the obstacle is assumed to be under stationary state and the real detected state of the obstacle actually detected by the obstacle sensor unit at the predetermined time, the obstacle is a moving object. That is, when there is a discrepancy between the estimated detected state estimated to be detected at the second time after a lapse of a predetermined time period from the first time and the real detected state actually sensed at the second time, the obstacle is determined to be a moving body.

The in-vehicle object determining apparatus in the present disclosure can determine whether the obstacle detected by the obstacle sensor unit is a moving body irrespective of whether the vehicle is traveling or at a stop.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The following will describe embodiments of the present disclosure, using drawings.

First Embodiment

<Schematic Configuration of Drive Assist System 100>

Figure 1:
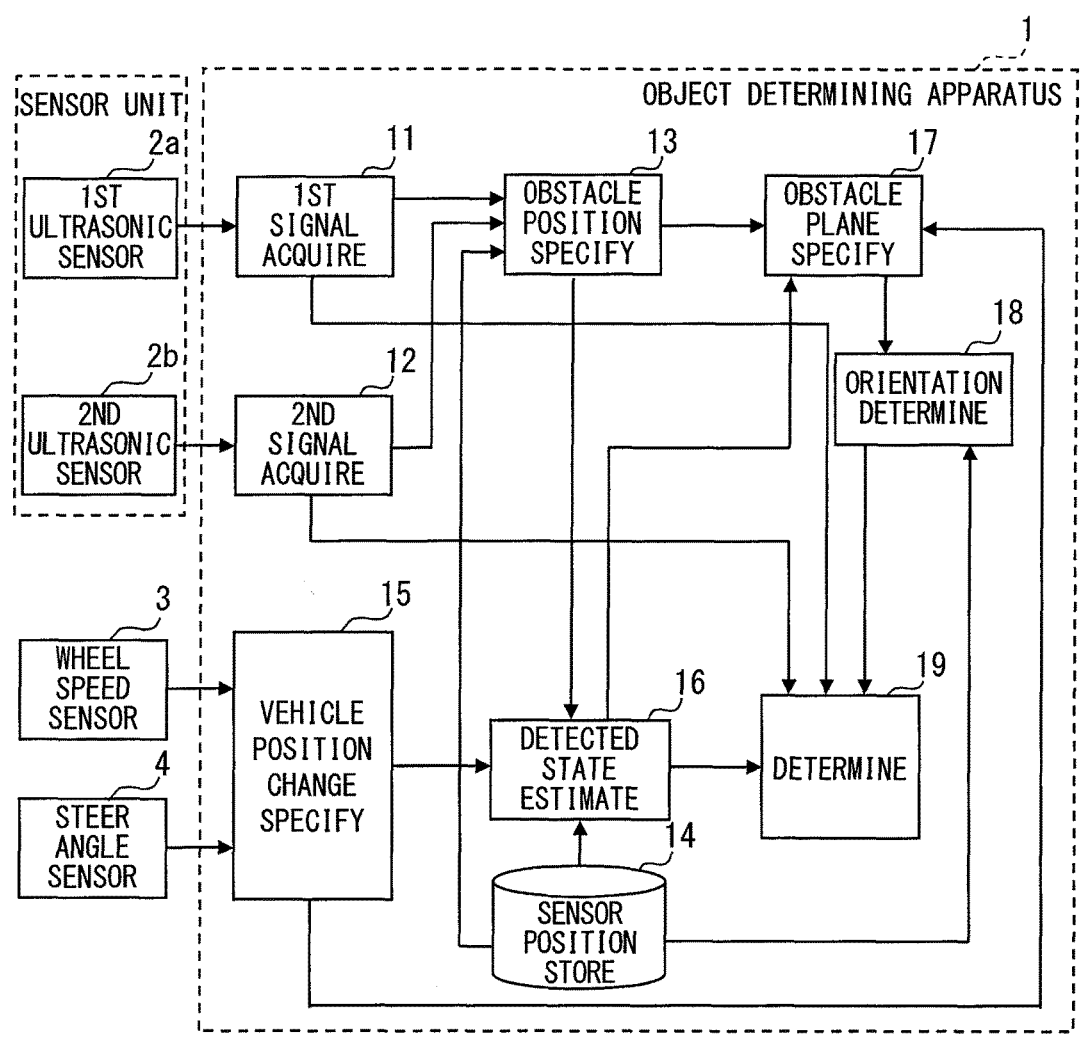
FIG. 1 is a block diagram illustrating an example of a schematic configuration of a drive assist system according to a first embodiment.

FIG. 1 is a diagram illustrating an example of a schematic configuration of a drive assist system 100 to which the present disclosure is applied. The drive assist system 100 is mounted in a vehicle. As in FIG. 1, the drive assist system 100 includes an object determining apparatus 1, a first ultrasonic sensor 2a, a second ultrasonic sensor 2b, a wheel speed sensor 3, and a steering angle sensor 4. As necessary, the vehicle in which the drive assist system 100 is mounted is referred to as a host vehicle (HV).

The first ultrasonic sensor 2a is mounted on a side surface of the front portion of the vehicle to detect an obstacle which is present in a lateral region relative to the front portion of the vehicle. The second ultrasonic sensor 2b is mounted on a side surface of the rear portion of the vehicle to detect an obstacle which is present in a lateral region relative to the rear portion of the vehicle. The first and second ultrasonic sensors 2a and 2b are referred to as obstacle sensors. The first and second ultrasonic sensors 2a and 2b are generally referred to as an ultrasonic sensor unit or an obstacle sensor unit. In short, the obstacle sensor unit includes a plurality of obstacle sensors or at least one obstacle sensor.

The first and second ultrasonic sensors 2a and 2b may be disposed on the left and right side surfaces of the vehicle, on the left side surface of the vehicle, or on the right side surface of the vehicle. The following description will be continued on the assumption that the first and second ultrasonic sensors 2a and 2b are disposed on the right side surface of the vehicle.

Each of the first and second ultrasonic sensors 2a and 2b transmits a search wave and receives a reflected wave of the search wave reflected by an obstacle to detect a distance from the first or second ultrasonic sensor 2a or 2b to the obstacle (hereinafter referred to as the distance to obstacle). Each of the first and second ultrasonic sensors 2a and 2b such that the center line of the directionality thereof is parallel with, e.g., the direction of the axle of the vehicle.

Figure 2:
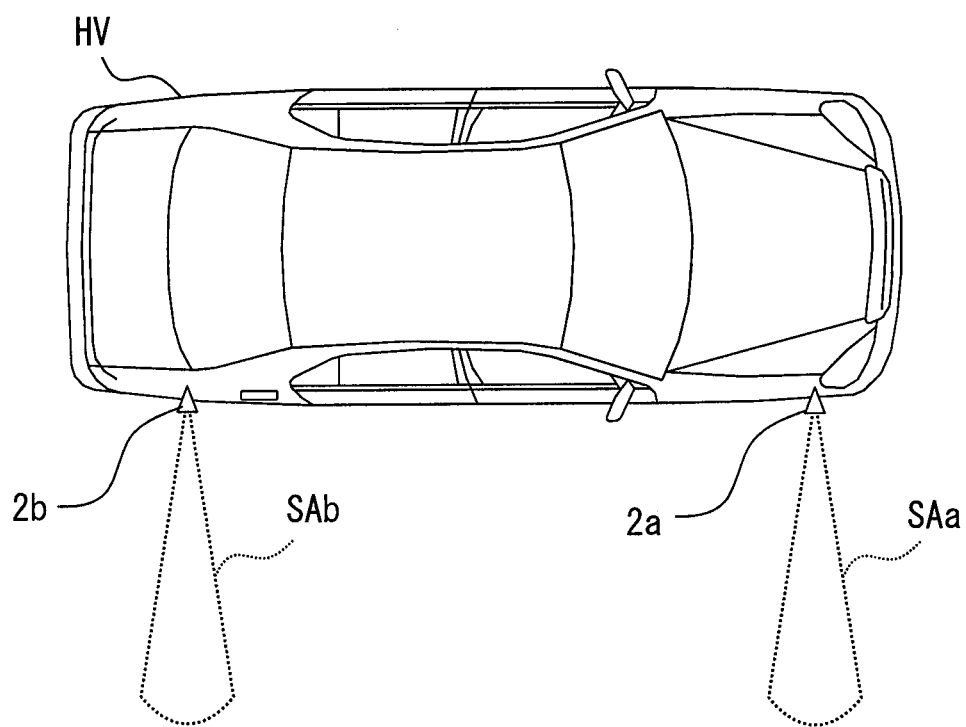
FIG. 2 is a schematic diagram illustrating an example of the respective detection ranges of first and second ultrasonic sensors.

As in FIG. 2, the first ultrasonic sensor 2a is mounted on the right side surface of the front portion of the vehicle (HV in FIG. 2), while the second ultrasonic sensor 2b is mounted on the right side surface of the rear portion of the vehicle. Consequently, the detection range (SAa in FIG. 2) of the first ultrasonic sensor 2a and the detection range (SAb in FIG. 2) of the second ultrasonic sensor 2b are arranged in an anterior position and a posterior position along the front-to-rear direction of the vehicle on the right side of the vehicle.

The wheel speed sensor 3 sequentially outputs pulse signals according to the respective rotation speeds of individual rolling wheels. The steering angle sensor 4 is a sensor which detects the steering angle of the vehicle. The steering angle sensor 4 assumes that a steering angle when the vehicle is traveling straight is at a neutral position (0 degrees) and sequentially outputs a rotation angle from the neutral position as a steering angle.

The object determining apparatus 1 includes an electronic control unit (also referred to as a control circuit). The electronic control unit includes a microcomputer. The microcomputer includes a CPU, memory such as ROM and RAM, I/Os, and a bus connecting the foregoings, each of which is well known. The object determining apparatus 1 performs various processes such as an obstacle position retaining process and an object determining process each described later based on various information input from the first and second ultrasonic sensors 2a and 2b, the wheel speed sensor 3, or the steering angle sensor 4. The object determining apparatus 1 is referred to as an in-vehicle object determining apparatus. Some or all of the functions performed by the object determining apparatus 1 or the electronic control unit may be configured in the form of hardware such as one or several ICs. "Information" is used not only as an uncountable noun, but also as a countable noun.

<Detailed Configuration of Object Determining Apparatus 1>

As in FIG. 1, the electronic control unit of the object determining apparatus 1 includes a first signal acquisition section 11, a second signal acquisition section 12, an obstacle position specification section 13, a vehicle position change specification section 15, a detected state estimation section 16, an obstacle plane specification section 17, an orientation determination section 18, and a determination section 19. These sections are each referred to as a device or a module. The object determining apparatus 1 further includes a sensor position storing element 14.

The first signal acquisition section 11 sequentially acquires a signal output from the first ultrasonic sensor 2a; the signal indicates the presence or absence of a obstacle detected by the first ultrasonic sensor 2a or is according to the distance to the detected obstacle. The second signal acquisition section 12 sequentially acquires a signal output from the second ultrasonic sensor 2b; the signal indicates the presence or absence of an obstacle detected by the second ultrasonic sensor 2b or is according to the detected distance to obstacle.

The obstacle position specification section 13 specifies a position of an obstacle present in a peripheral region neighboring the right side of the vehicle, the position being relative to the vehicle, using the transmission direction of the search wave from the first ultrasonic sensor 2a and the signal from the first ultrasonic sensor 2a which is acquired by the first signal acquisition section 11. More specifically, the obstacle position specification section 13 specifies a position of a reflection point in the obstacle where the search wave from the first ultrasonic sensor 2a is reflected, the position being relative to the vehicle.

When the signal according to the distance to obstacle can be acquired by the first signal acquisition section 11, the obstacle position specification section 13 specifies a position of the obstacle relative to an installed position where the first ultrasonic sensor 2a is installed. Such a position of the obstacle is specified as a position away from the installed position of the first ultrasonic sensor 2a by the distance to obstacle in a transmission direction in which the search wave obtaining the reflected wave is transmitted. Then, the obstacle position specification section 13 specifies the position of the obstacle (referred to an obstacle position) in an X-Y coordinate system using the vehicle position as the origin based on the specified position of the obstacle relative to the installed position of the first ultrasonic sensor 2a and on a position in the vehicle of the installed position of the first ultrasonic sensor 2a, the position in the vehicle being stored in the sensor position storing element 14. It is assumed that the X-Y coordinate system has an X-axis and a Y-axis in a horizontal plane and uses, as the vehicle position, a rear wheel axle center position, for instance.

The obstacle position specification section 13 also uses the transmission direction of the search wave from the second ultrasonic sensor 2b and the signal from the second ultrasonic sensor 2b which is acquired by the second signal acquisition section 12 to specify a position of the obstacle present in a peripheral region neighboring the right side of the vehicle, relative to the vehicle.

When the signal according to the distance to obstacle can be acquired by the second signal acquisition section 12, the obstacle position specification section 13 specifies a position of the obstacle relative to an installed position where the second ultrasonic sensor 2b is installed. Such a position of the obstacle is specified as a position away from the installed position of the second ultrasonic sensor 2b by the distance to obstacle in a transmission direction of the search wave obtaining the reflected wave. Then, the obstacle position specification section 13 specifies the obstacle position in the X-Y coordinate system using the vehicle position as the origin based on the specified position of the obstacle relative to the installed position of the second ultrasonic sensor 2b and on a position in the vehicle of the installed position of the second ultrasonic sensor 2b, the position in the vehicle being stored in the sensor position storing element 14.

The respective installed positions in the vehicle of the first and second ultrasonic sensors 2a and 2b, which are stored in the sensor position storing element 14, are referred to as sensor positions.

The vehicle position change specification section 15 specifies a change in the position of the vehicle based on the travel distance of the vehicle which is determined from the pulse signals from the wheel speed sensor 3 and on a change in the steering angle of the vehicle which is sequentially detected by the steering angle sensor 4.

The detected state estimation section 16 estimates the obstacle position at a predetermined time (second time) on condition that the object detected previously (at a first time) is assumed to be under stationary state. The estimation is performed based on the obstacle position specified by the obstacle position specification section 13, on the installed position of the first or second ultrasonic sensor 2a or 2b, which is stored in the sensor position storing element 14, and on the vehicle position change which is specified by the vehicle position change specification section 15. Then, the detected state estimation section 16 estimates the detected state of the obstacle by using the first or second ultrasonic sensor 2a or 2b based on the estimated obstacle position. The present embodiment will describe the case where a detectability of the obstacle by the first or second ultrasonic sensor 2a or 2b or a distance to the detected obstacle at the current time (second time) is estimated as the detected state (i.e., where the estimated detected state is calculated). "Previously" is referred to as "at a previous time" or "at the first time". The "predetermined time" is referred to as the "second time" after a lapse of a predetermined time period from the first time. "The detected state is estimated" can be stated also as "the estimated detected state is calculated".

The detected state estimation section 16 estimates the obstacle position at the current time on condition that the obstacle is assumed to be under stationary state. The estimation is performed based on the obstacle position specified by the obstacle position specification section 13 for the obstacle previously detected by the first ultrasonic sensor 2a and on the vehicle position change specified by the vehicle position change specification section 15 during a period from the detection of the obstacle by the first ultrasonic sensor 2a to the current time. Then, the detected state estimation section 16 estimates the detectability of the obstacle by the first or second ultrasonic sensor 2a or 2b and the distance to the detected obstacle at the current time. The detection is performed based on the positional relationship between the estimated obstacle position at the current time and the detection ranges determined by the respective installed positions of the first and second ultrasonic sensors 2a and 2b.

For example, when the estimated obstacle position at the current time is not included in the detection range of the first ultrasonic sensor 2a, but is included in the detection range of the second ultrasonic sensor 2b, the detected state estimation section 16 estimates that the detected state by the first ultrasonic sensor 2a is "non-detectable" and the detected state by the second ultrasonic sensor 2b is "detectable". When the estimated obstacle position at the current time is included in the respective detection ranges of the first and second ultrasonic sensors 2a and 2b, the detected state estimation section 16 also estimates the respective distances to the obstacle detected by the first and second ultrasonic sensors 2a and 2b. The estimation is performed based on the estimated obstacle position at the current time and the respective installed positions of the first and second ultrasonic sensors 2a and 2b.

As the detection ranges, ranges expanding into, e.g., sectorial shapes from the respective installed positions of the first and second ultrasonic sensors 2a and 2b in the transmission directions of the search waves are assumed to be determined in advance. Information on the detection ranges may be stored together with the respective installed positions of the first and second ultrasonic sensors 2a and 2b in, e.g., the sensor position storing element 14.

For the obstacle detected by the second ultrasonic sensor 2b, the detectability of the obstacle and the distance to the detected obstacle are estimated in the same manner as described for the obstacle detected by the first ultrasonic sensor 2a. The detected state estimation section 16 is assumed to sequentially estimate the obstacle at the current time to thus sequentially update the position of the previously specified obstacle position in the X-Y coordinate system mentioned above.

The obstacle plane specification section 17 specifies the plane (hereinafter referred to as the obstacle plane) of an obstacle relative to the vehicle at a predetermined time. The specification is performed based on the distance to the obstacle sequentially detected by the first or second ultrasonic sensor 2a or 2b, the installed position of the first or second sensor 2a or 2b which is stored in the sensor position storing element 14, and the vehicle position change specified by the vehicle position change specification section 15. The present embodiment will describe the case where the obstacle plane at the current time is specified.

The obstacle plane specification section 17 specifies a line segment obtained by connecting a sequence of consecutive points which are spaced apart from each other at intervals of not more than a specified distance as the obstacle plane relative to the vehicle at the current time. The line segment is specified based on the point sequence of the obstacle positions in the foregoing X-Y coordinate system at the current time. The point sequence of the obstacle positions in the X-Y coordinate system at the current time is obtained by the detected state estimation section 16 by sequentially updating the obstacle position (i.e., the position of the reflection point in the obstacle relative to the vehicle position) which is sequentially specified by the obstacle position specification section 13.

The obstacle plane specification section 17 is not limited to a configuration which specifies a line obtained by connecting a sequence of individual points as the obstacle plane. The obstacle plane specification section 17 may have a configuration which specifies an approximate line or an approximate curve obtained from a sequence of individual points as the obstacle plane.

The orientation determination section 18 determines whether the obstacle plane is facing the installed position of the first or second ultrasonic sensor 2a or 2b at a predetermined time. The determination is made based on the obstacle plane specified by the obstacle plane specification section 17 and on the installed position of the first or second ultrasonic sensor 2a or 2b, which is stored in the sensor position storing element 14. The present embodiment will describe the case of determining whether the obstacle plane is facing the installed position of the first or second ultrasonic sensor 2a or 2b at the current time.

When a perpendicular line can be drawn from the installed position of the first or second ultrasonic sensor 2a or 2b which is stored in the sensor position storing element 14 to the line segment showing the obstacle plane which is specified by the obstacle plane specification section 17, the orientation determination section 18 determines that the obstacle plane is facing the installed position of the first or second ultrasonic sensor 2a or 2b. By contrast, when a perpendicular line cannot be drawn from the installed position of the first or second ultrasonic sensor 2a or 2b to the line segment showing the obstacle plane, the orientation determination section 18 determines that the obstacle plane is not facing the installed position of the first or second ultrasonic sensor 2a or 2b.

Figure 3:
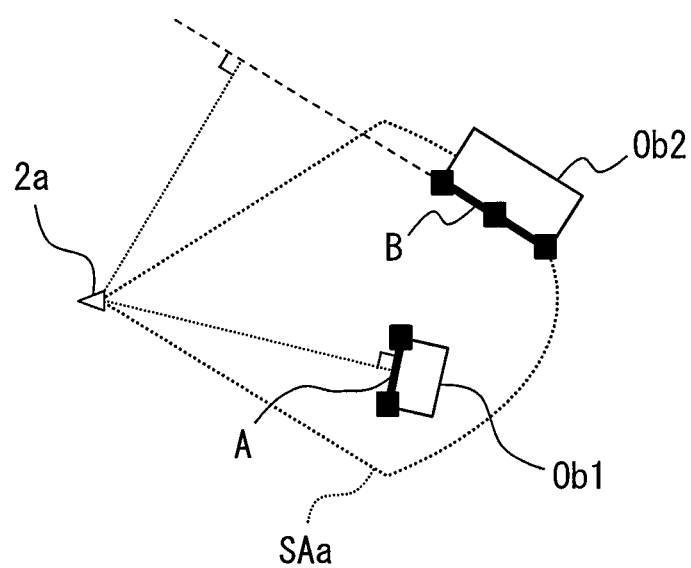
FIG. 3 is a schematic diagram illustrating a determination by an orientation determination section.

Using FIG. 3, the determination by the orientation determination section 18 will be described. FIG. 3 shows the case of determining whether the obstacle plane is facing the installed position of the first ultrasonic sensor 2a. In FIG. 3, SAa shows the detection range of the first ultrasonic sensor 2a, Ob1 and Ob2 show obstacles, and the solid squares show the obstacle positions. Also, A shows the line segment showing the obstacle plane of the obstacle Ob1; B shows the line segment showing the obstacle plane of the obstacle Ob2.

As in FIG. 3, it is determined that the obstacle Ob1 which allows a perpendicular line to be drawn from the installed position of the first ultrasonic sensor 2a to the line segment A showing the obstacle plane has the obstacle plane facing the installed position of the first ultrasonic sensor 2a. By contrast, it is determined that the obstacle Ob2 which does not allow a perpendicular line to be drawn from the installed position of the first ultrasonic sensor 2a to the line segment B showing the obstacle plane does not have the obstacle plane facing the installed position of the first ultrasonic sensor 2a.

When a perpendicular line can be drawn from the installed position of the first or second ultrasonic sensor 2a or 2b, which is stored in the sensor position storing element 14, to the line segment showing the obstacle plane, which is specified by the obstacle plane specification section 17, through the detection range of the first or second ultrasonic sensor 2a or 2b, the orientation determination section 18 may be configured to determine that the obstacle plane is facing the installed position of the first or second ultrasonic sensor 2a or 2b. That is, the orientation determination section 18 may be configured to determine whether the portion of the obstacle plane which is included in the detection range of the obstacle sensor is facing the sensor position.

Whether the obstacle plane is facing the installed position of the second ultrasonic sensor 2b is also determined in the same manner as when whether the obstacle surface is facing the installed position of the first ultrasonic sensor 2a is determined.

The determination section 19 determines whether the obstacle detected by the first or second ultrasonic sensor 2a or 2b is a mobile object. The details of the determination section 19 will be described later.

<Obstacle Position Retaining Process>

Figure 4:
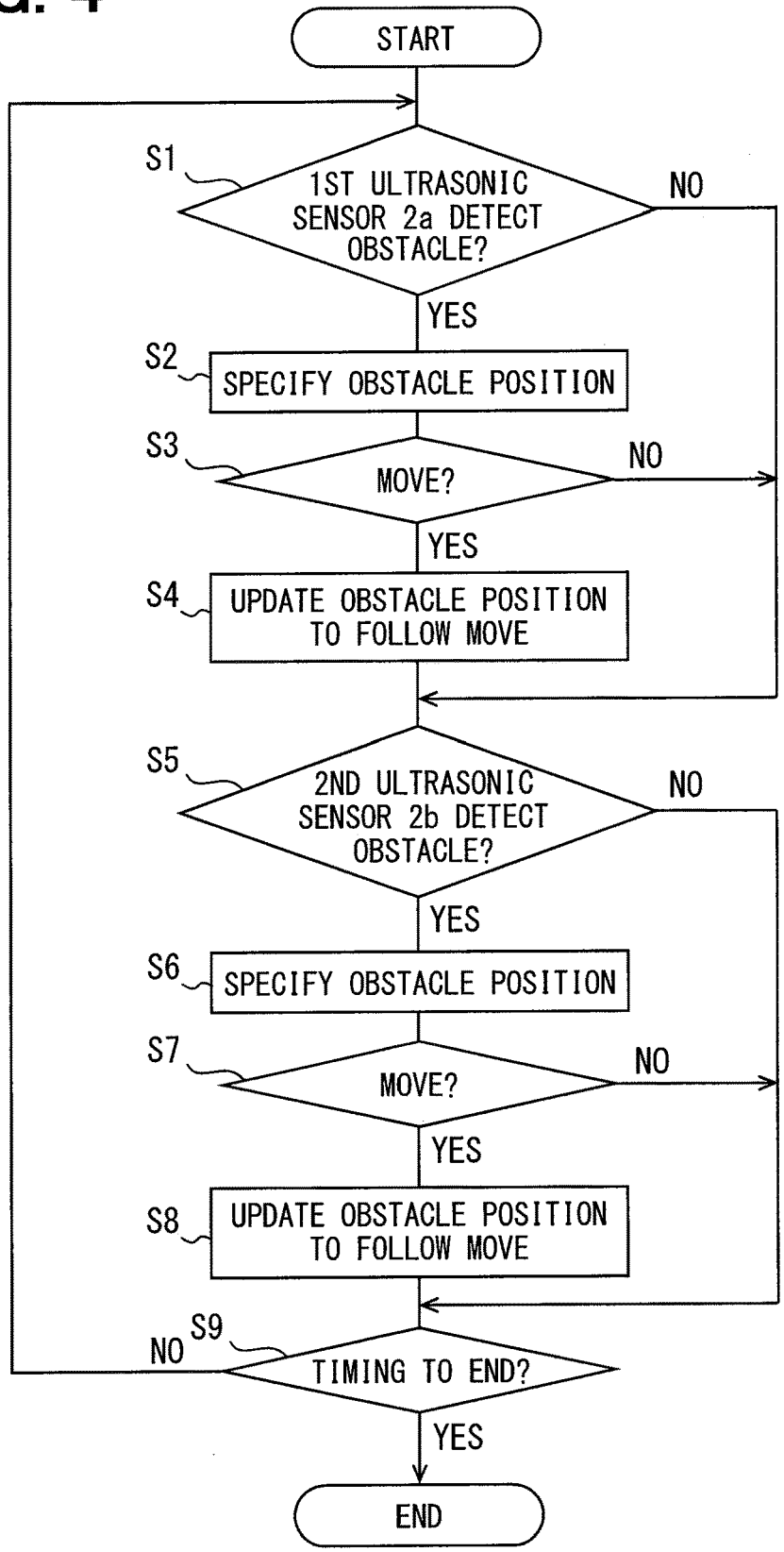
FIG. 4 is a flowchart illustrating an example of a sequence of an obstacle position retaining process in an object determining apparatus.

Using a flowchart in FIG. 4, the obstacle position retaining process in the object determining apparatus 1 (i.e., electronic control unit) will be described. The obstacle position retaining process is a process of specifying the obstacle position of the obstacle detected by the first or second ultrasonic sensor 2a or 2b and retains the obstacle position to follow the movement of the vehicle. The flowchart in FIG. 4 may be configured appropriately to be started when, e.g., the ignition power supply of the vehicle is turned ON.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device or a module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

First, in S1, when the first signal acquisition section 11 acquires a signal showing the detection of an obstacle from the first ultrasonic sensor 2a, it is determined that the obstacle is detected by the first ultrasonic sensor 2a (S1: YES), and the process moves to S2. By contrast, when the first signal acquisition section 11 does not acquire the signal showing the detection of an obstacle from the first ultrasonic sensor 2a, it is determined that no obstacle is detected by the first ultrasonic sensor 2a (S1: NO), and the process moves to S5.

In S2, the obstacle position specification section 13 specifies the obstacle position in the X-Y coordinate system using the vehicle position as the origin. The specification is performed based on the transmission direction of the search wave from the first ultrasonic sensor 2a, on the signal from the first ultrasonic sensor 2a which is acquired by the first signal acquisition section 11, and on the installed position of the first ultrasonic sensor 2a. The specified obstacle position is stored in, e.g., a memory such as a RAM in the object determining apparatus 1.

In S3, when the vehicle is moving (S3: YES), the process moves to S4. By contrast, when the vehicle is at a stop (S3: NO), the process moves to S5. The object determining apparatus 1 may be configured appropriately such that whether the vehicle is moving or at a stop is determined by, e.g., the detected state estimation section 16 based on the pulse signals from the wheel speed sensor 3.

In S4, the detected state estimation section 16 updates the obstacle position stored in the memory in response to the movement of the vehicle. The obstacle position stored in the memory is updated as follows. That is, the obstacle position specified and stored in S2 is moved by a distance corresponding to the vehicle position change, which is specified by the vehicle position change specification section 15, during a period from the detection of the obstacle in S1 to the current time, but in a direction opposite to the direction of the vehicle position change. The position reached as a result of the movement is estimated as the obstacle position at the current time on condition that the obstacle is assumed to be under stationary state; the obstacle position specified and stored in S2 is updated to the estimated obstacle position.

In S5, when the second signal acquisition section 12 acquires a signal showing the detection of an obstacle from the second ultrasonic sensor 2b, it is determined that the obstacle is detected by the second ultrasonic sensor 2b (S5: YES), and the process moves to S6. By contrast, when the second signal acquisition section 12 does not acquire the signal showing the detection of an obstacle from the second ultrasonic sensor 2b, it is determined that no obstacle is detected by the second ultrasonic sensor 2b (S5: NO), and the process moves to S7.

In S6, the obstacle position specification section 13 specifies the obstacle position in the X-Y coordinate system using the vehicle position as the origin. The specification is performed based on the transmission direction of the search wave from the second ultrasonic sensor 2b, on the signal from the second ultrasonic sensor 2b which is acquired by the second signal acquisition section 12, and on the installed position of the second ultrasonic sensor 2b. When the specified obstacle position is proximate to the obstacle position updated in S4, the specified obstacle position is integrated with the obstacle position updated in S4 and stored in the memory.

In S7, when the vehicle is moving (S7: YES), the process moves to S8. By contrast, when the vehicle is at a stop (S7: NO), the process moves to S9. The object determining apparatus 1 may determine whether the vehicle is moving or at a stop in the same manner as in S3.

In S8, in the same manner as in S4, the detected state estimation section 16 updates the obstacle position stored in the memory in response to the movement of the vehicle. The obstacle position stored in the memory is updated as follows. That is, the obstacle position specified and stored in S2 is moved by a distance corresponding to the vehicle position change during the period from the detection of the obstacle in S1 to the current time which is specified by the vehicle position change specification section 15, but in the direction opposite to the direction of the vehicle position change. The position reached as a result of the movement is estimated as the obstacle position at the current time on condition that the obstacle is assumed to be under stationary state; the obstacle position is updated to the estimated obstacle position. The obstacle position updated in S4 is updated as follows. That is, the obstacle position updated in S4 is moved by a distance corresponding to the vehicle position change during a period from the updating of the obstacle position in S4 to the current time which is specified by the vehicle position change specification section 15, but in a direction opposite to the direction of the vehicle position change. The position reached as a result of the movement is estimated as the obstacle position at the current time and the obstacle position is updated. The obstacle position specified and stored in S6 is updated as follows. That is, the obstacle position specified and stored in S6 is moved by a distance corresponding to the vehicle position change during a period from the detection of the obstacle in S5 to the current time which is specified by the vehicle position change specification section 15, but in a direction opposite to the direction of the vehicle position change. The position reached as a result of the movement is estimated as the obstacle position at the current time on condition that the obstacle is assumed to be under stationary state; the obstacle position is updated.

In S9, when it is the timing to end the obstacle position retaining process (S9: YES), the obstacle position retaining process is ended. By contrast, when it is not the timing to end the obstacle position retaining process (S9: NO), the process returns to S1 to be repeated. The timing to end the obstacle retaining process is recognized when, e.g., the ignition power supply of the vehicle is turned OFF.

<Object Determining Process>

Using the flowchart in FIG. 5, the object determining process in the object determining apparatus 1 will be described. The object determining process is the process of determining whether the obstacle detected by the first or second ultrasonic sensor 2a or 2b is a moving object. The flowchart in FIG. 5 may be configured appropriately to be started when, e.g., the ignition power supply of the vehicle is turned ON. The obstacle position retaining process described above is assumed to be performed in parallel.

First, in S21, the detected state estimation section 16 estimates a detected state such as the detectability of an obstacle by the first or second ultrasonic sensor 2a or 2b at the current time or the distance to the detected obstacle at the current time. The estimation is performed based on the obstacle position at the current time which is stored in the obstacle position retaining process.

In S22, the obstacle plane specification section 17 specifies the obstacle plane relative to the vehicle at the current time based on the point sequence of the obstacle positions at the current time which is obtained as a result of sequential updating of the obstacle position at the current time in the detected state estimation section 16.

In S23, when the detected state estimation section 16 estimates that an obstacle is detectable by the first ultrasonic sensor 2a (S23: YES), the process moves to S24. By contrast, when the detected state estimation section 16 estimates that an obstacle is non-detectable by the first ultrasonic sensor 2a (S23: NO), the process moves to S25.

Figure 6:
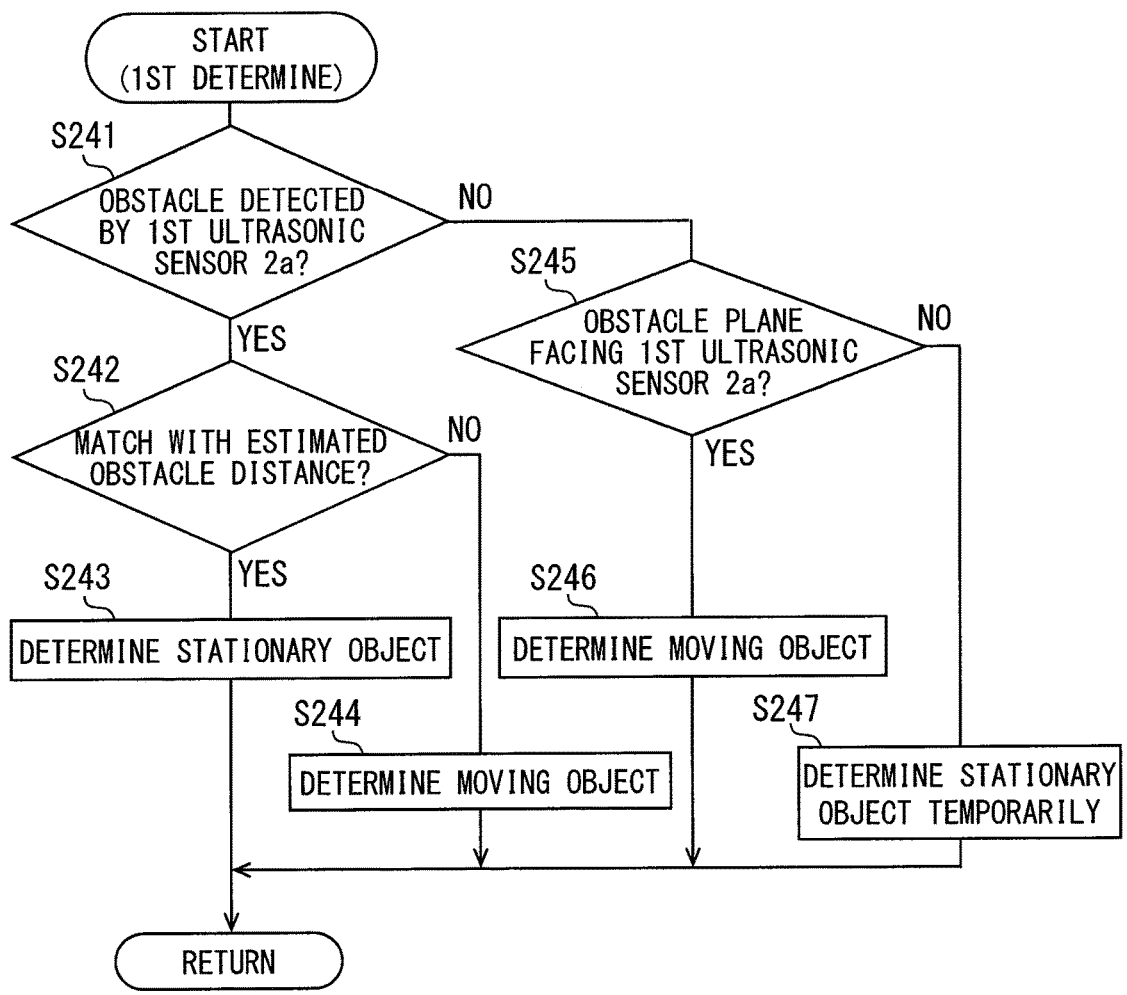
FIG. 6 is a flowchart illustrating an example of a sequence of a first determination-related process.

In S24, a first determination-related process is performed. Using the flowchart in FIG. 6, the outline of the first determination-related process will be described.

First, in S241, when the first signal acquisition section 11 acquires the signal showing the detection of an obstacle from the first ultrasonic sensor 2a, it is determined that the obstacle is detected by the first ultrasonic sensor 2a (S241: YES), and the process moves to S242. By contrast, when the first signal acquisition section 11 does not acquire the signal showing the detection of an obstacle from the first ultrasonic sensor 2a, it is determined that no obstacle is detected by the first ultrasonic sensor 2a (S241: NO), and the process moves to S245.

In S242, the determination section 19 determines whether there is a match between the distance to the obstacle detected in S241 and the distance to obstacle estimated in S21 for the obstacle estimated to be detectable by the first ultrasonic sensor 2a in S21. The "match" mentioned herein is not limited to a configuration which determines that there is a match when there is a complete match between the distance to the obstacle detected in S241 and the distance to obstacle estimated in S21. A configuration which determines that there is a match even when there is error within an allowable range may be used. When there is a match (S242: YES), the process moves to S243. By contrast, when there is no match (S242: NO), the process moves to S244.

In S243, the determination section 19 determines that the obstacle detected in S241 is a stationary object, and the process moves to S25. In S244, the determination section 19 determines that the obstacle detected in S241 is a moving object, and the process moves to S25. The obstacle detected in S241 may be referred to as an obstacle which is among the obstacles having the obstacle positions specified by the obstacle position specification section 13 and which is estimated to be detectable by the first ultrasonic sensor 2a in S21.

In S245 when no obstacle is detected by the first ultrasonic sensor 2a, the orientation determination section 18 determines whether the obstacle plane of the obstacle estimated to be detectable by the first ultrasonic sensor 2a in S21 is facing the installed position of the first ultrasonic sensor 2a. When the obstacle plane is facing the installed position of the first ultrasonic sensor 2a (S245: YES), the process moves to S246. By contrast, when the obstacle plane is not facing the installed position of the first ultrasonic sensor 2a (S245: NO), the process moves to S247.

In S246, the determination section 19 determines that the obstacle estimated to be detectable by the first ultrasonic sensor 2a in S21 is a moving object, and the process moves to S25. In S247, the determination section 19 temporarily determines that the obstacle estimated to be detectable by the first ultrasonic sensor 2a in S21 is a stationary object, and the process moves to S25. The object determining apparatus 1 may be configured such that the determination section 19 makes no determination in S247, and the process moves to S25.

Figure 5:
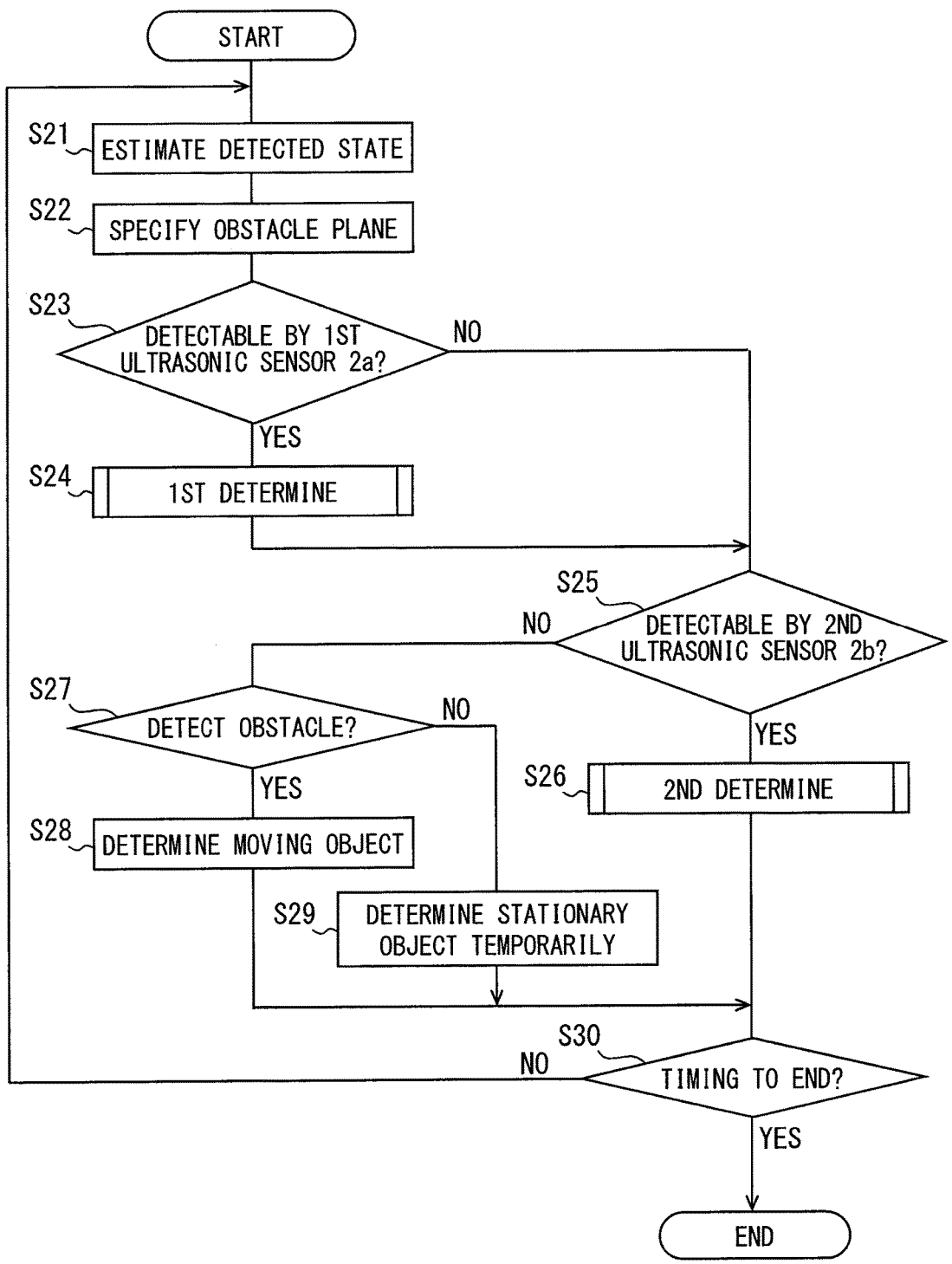
FIG. 5 is a flowchart illustrating an example of a sequence of an object determining process in the object determining apparatus.

Back to FIG. 5, in S25, when the obstacle is estimated to be detectable by the second ultrasonic sensor 2b in S21 (S25: YES), the process moves to S26. By contrast, when the obstacle is estimated to be non-detectable by the second ultrasonic sensor 2b (S25: NO), the process moves to S27.

Figure 7:
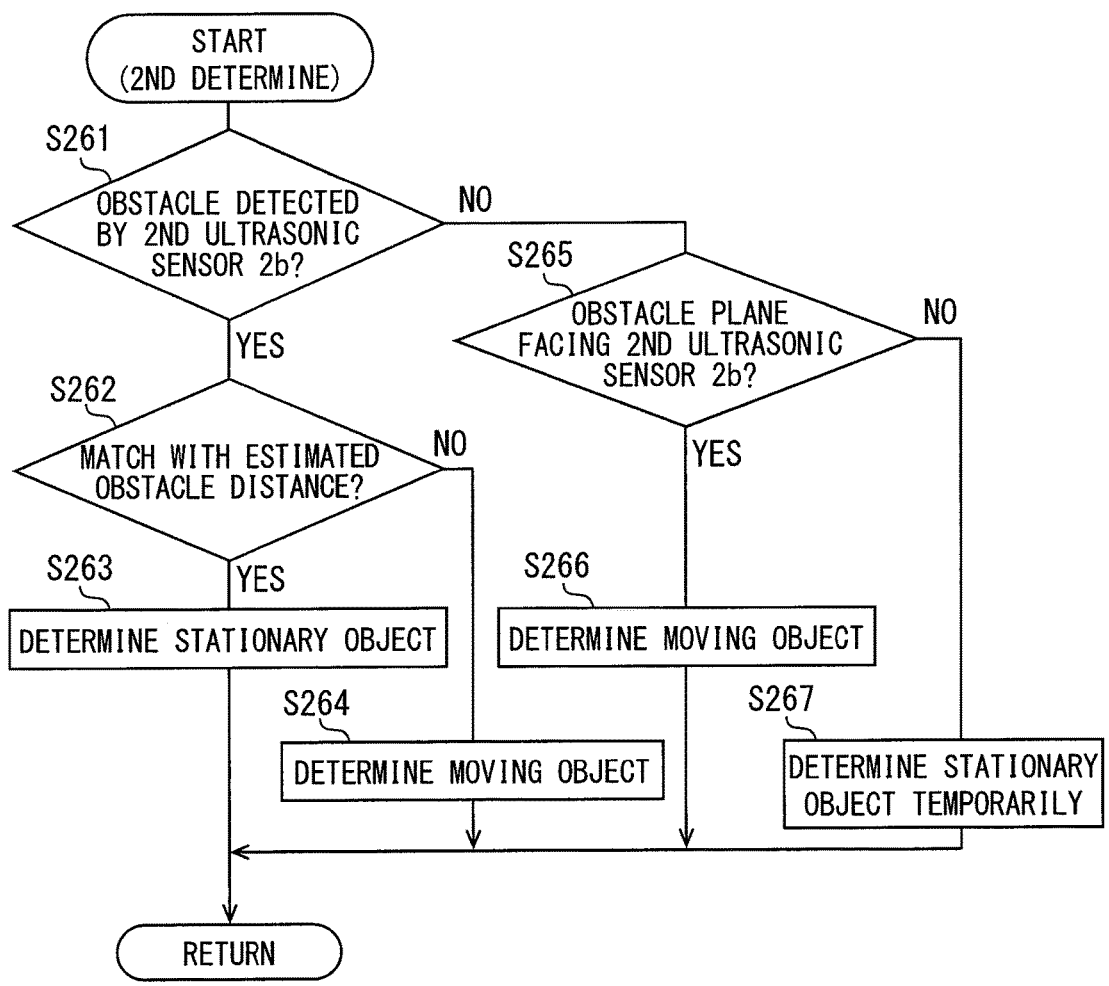
FIG. 7 is a flowchart illustrating an example of a sequence of a second determination-related process.

In S26, a second determination-related process is performed. Using the flowchart in FIG. 7, the outline of the second determination-related process will be described.

First, in S261, when the second signal acquisition section 12 acquires the signal showing the detection of an obstacle from the second ultrasonic sensor 2b, it is determined that the obstacle is detected by the second ultrasonic sensor 2b (S261: YES), and the process moves to S262. By contrast, when the second signal acquisition section 12 does not acquire the signal showing the detection of an obstacle from the second ultrasonic sensor 2b, it is determined that no obstacle is detected by the second ultrasonic sensor 2b (S261: NO), and the process moves to S265.

In S262, the determination section 19 determines whether there is a match between the distance to the obstacle detected in S261 and the distance to the obstacle estimated in S21 for the obstacle estimated to be detectable by the second ultrasonic sensor 2b in S21. The "match" mentioned herein is not limited to a configuration which determines that there is a match when there is a complete match between the distance to the obstacle detected in S261 and the distance to obstacle estimated in S21. A configuration which determines that there is a match even when there is error within an allowable range may be used. When the determination section 19 determines that there is a match (S262: YES), the process moves to S263. By contrast, when the determination section 19 determines that there is no match (S262: NO), the process moves to S264.

In S263, the determination section 19 determines that the obstacle detected in S261 is a stationary object, and the process moves to S30. In S264, the determination section 19 determines that the obstacle detected in S261 is a moving object, and the process moves to S30. The obstacle detected in S261 may be referred to as an obstacle which is among the obstacles having the obstacle positions specified by the obstacle position specification section 13 and which is estimated to be detectable by the second ultrasonic sensor 2b in S21.

In S265 when no obstacle is detected by the second ultrasonic sensor 2b, the orientation determination section 18 determines whether the obstacle plane of the obstacle estimated to be detectable by the second ultrasonic sensor 2b in S21 is facing the installed position of the second ultrasonic sensor 2b. When the obstacle plane is facing the installed position of the second ultrasonic sensor 2b (S265: YES), the process moves to S266. By contrast, when the obstacle plane is not facing the installed position of the second ultrasonic sensor 2b (S265: NO), the process moves to S267.

In S266, the determination section 19 determines that the obstacle estimated to be detectable by the second ultrasonic sensor 2b in S21 is a moving object, and the process moves to S30. In S267, the determination section 19 temporarily determines that the obstacle estimated to be detectable by the second ultrasonic sensor 2b in S21 is a stationary object, and the process moves to S30. The object determining apparatus 1 may be configured such that the determination section 19 makes no determination in S267, and the process moves to S30.

In S30, when it is the timing to end the object determining process (S30: YES), the object determining process is ended. By contrast, when it is not the timing to end the object determining process (S30: NO), the process returns to S21 to be repeated. The timing to end the object determining process is recognized when, e.g., the ignition power supply of the vehicle is turned OFF.

Figure 8:
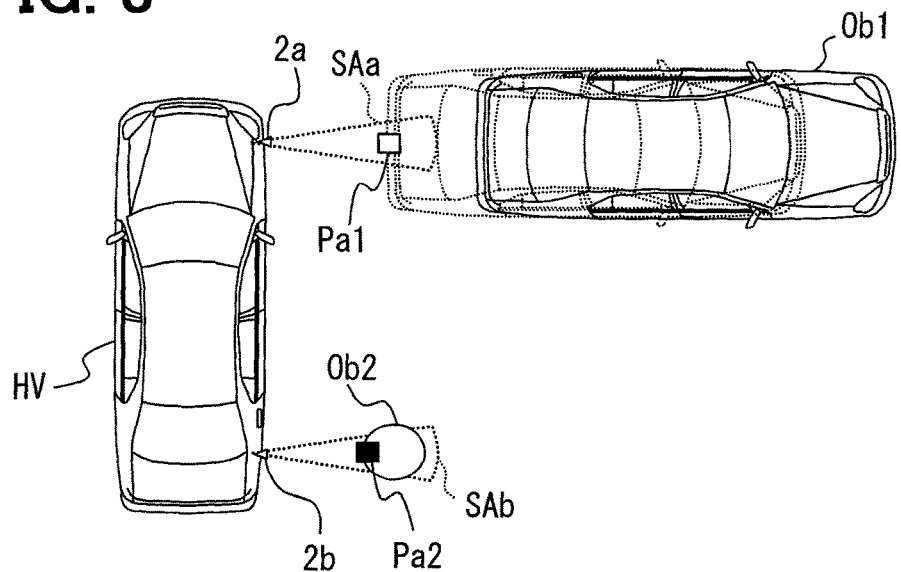
FIG. 8 is a schematic diagram illustrating a determination of whether an obstacle is a moving object, based on a discrepancy between an estimated detected state of the obstacle and a real detected state of the obstacle when a vehicle is at a stop.
Figure 9:
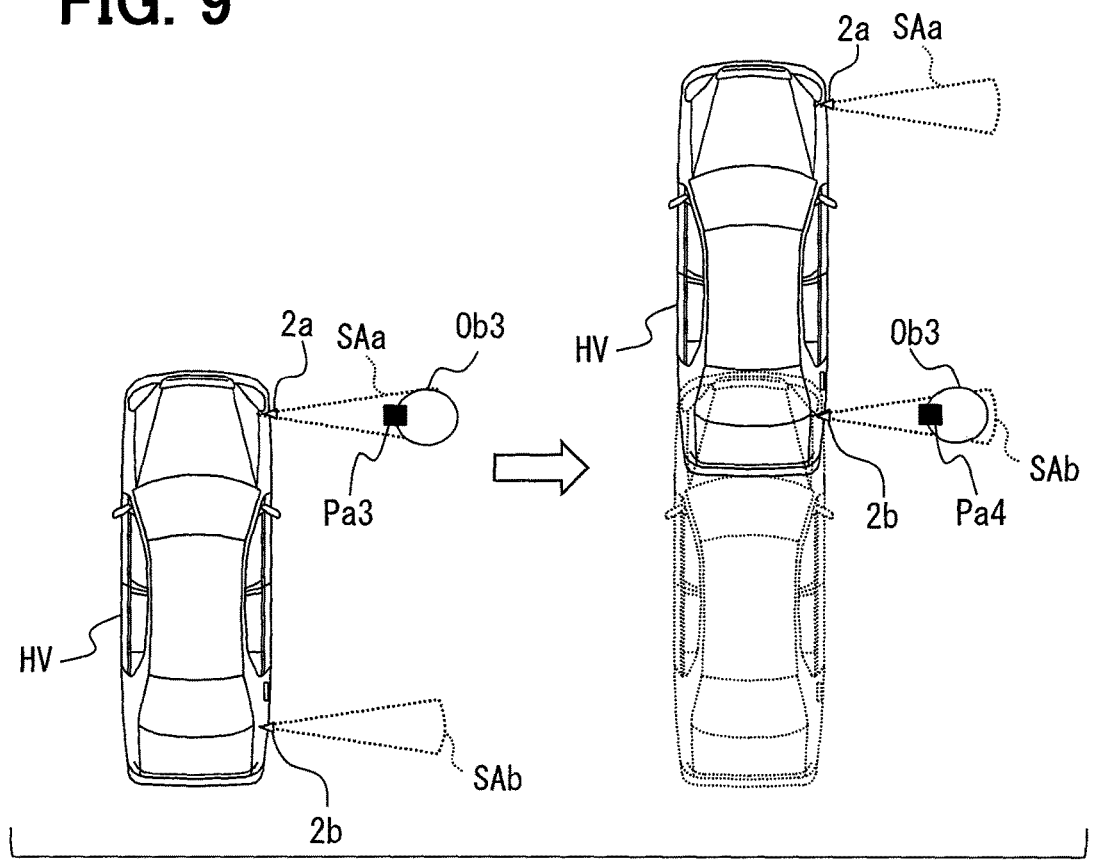
FIG. 9 is a schematic diagram illustrating a determination of whether the obstacle is a moving object, when the vehicle is moving.

In FIGS. 8 and 9, a determination of whether the obstacle is a moving object will be described, based on a discrepancy between the estimated detected state of the obstacle and the real detected state of the obstacle. In FIG. 8, a determination of whether the obstacle is a moving object will be described, based on a discrepancy between the estimated detected state of the obstacle and the real detected state of the obstacle when the vehicle is at a stop.

In FIG. 8, HV denotes the vehicle, Ob1 denotes the moving obstacle, Ob2 denotes the stationary obstacle, Pa1 denotes the obstacle position of the obstacle Ob1 which is specified when the obstacle Ob1 is located within the detection range SAa of the first ultrasonic sensor 2a, and Pa2 denotes the obstacle position of the obstacle Ob2.

When the vehicle HV is at a stop, the stationary obstacle Ob2 temporarily detected at the obstacle position Pa2 continues to be detected by the second ultrasonic sensor 2b and also the same distance to obstacle continues to be detected. By contrast, the moving obstacle Ob1 temporarily detected at the obstacle position Pa1 can no longer be detected by the first ultrasonic sensor 2a as a result of the movement of the obstacle Ob1 or a different distance to obstacle is detected.

Accordingly, when the vehicle HV is at a stop, a detected state such as the obstacle detectability or the distance to obstacle when the obstacle is assumed to be detected again by the first or second ultrasonic sensor 2a or 2b that has temporarily detected the obstacle is estimated. When there is a discrepancy between the estimated detected state and the real detected state, it can be determined that the obstacle is a moving object.

Subsequently, using FIG. 9, a determination of whether the obstacle is a moving object will be described, based on a discrepancy between the estimated detected state of the obstacle and the real detected state of the obstacle when the vehicle is moving.

In FIG. 9, HV denotes the vehicle, Ob1 denotes a stationary obstacle, Pa3 denotes the obstacle position of the obstacle Ob1 which is specified when the obstacle Ob1 is located within the detection range SAa of the first ultrasonic sensor 2a, and Pa4 denotes the position reached by the obstacle position Pa3 as a result of being moved by a distance corresponding to the vehicle position change, but in a direction opposite to the direction of the vehicle position change when viewed from the vehicle.

When the vehicle HV is moving, the obstacle position Pa3 of the stationary obstacle Ob1 temporarily detected by the first ultrasonic sensor 2a moves to a position reached as a result of being moved by the distance corresponding to the vehicle position change, but in the direction opposite to the direction of the vehicle position change when viewed from the vehicle. Accordingly, when the position Pa4 reached by the obstacle position Pa3 as a result of being moved by the distance corresponding to the vehicle position change, but in the direction opposite to the direction of the vehicle position change when viewed from the vehicle is located within the detection range SAb of the second ultrasonic sensor 2b, the second ultrasonic sensor 2b detects the obstacle Ob3 as well as a distance to obstacle which is equal to the distance from the second ultrasonic sensor 2b to the position Pa4.

By contrast, when the obstacle Ob3 is a moving obstacle, even when the position Pa4 reached by the obstacle position Pa3 as a result of being moved by the distance corresponding to the vehicle position change, but in the direction opposite to the direction of the vehicle position change when viewed from the vehicle is located within the detection range SAb of the second ultrasonic sensor 2b, the second ultrasonic sensor 2b does not detect the obstacle Ob3 or detects a distance to obstacle which is different from the distance from the second ultrasonic sensor 2b to the position Pa4. In this case, the first and second ultrasonic sensors 2a and 2b are referred to as first and second obstacle sensors.

Therefore, when the vehicle HV is moving, a detected state such as the obstacle detectability or the distance to obstacle when the obstacle is detected again by the ultrasonic sensor different from the ultrasonic sensor that has temporarily detected the obstacle is estimated and, when there is a discrepancy between the estimated detected state and a real detected state, it can be determined that the obstacle is a moving object. When the vehicle passes through the same place twice such as when the vehicle travels forward and then backward or travels backward and then forward, a detected state such as the obstacle detectability or the distance to obstacle when the obstacle is detected again by the same ultrasonic sensor that has temporarily detected the obstacle is estimated and, when there is a discrepancy between the estimated detected state and a real detected state, it can also be determined that the obstacle is a moving object.

Thus, irrespective of whether the vehicle is at a stop or moving, it can be determined whether the obstacle is a moving object based on a discrepancy between the detected state of the obstacle which is estimated by the detected state estimation section 16 and the real detected state.

The present embodiment has described the case using the two ultrasonic sensors. However, the same applies also to the case using a plurality of ultrasonic sensors more than the two ultrasonic sensors.

Summary of First Embodiment

With the configuration of the first embodiment, the determination section 19 determines that an obstacle is a moving object based on a discrepancy between the detected state of the obstacle which is estimated by the detected state estimation section 16 such as the obstacle detectability or the distance to obstacle and the real detected state of the obstacle in the first or second ultrasonic sensor 2a or 2b at the present time. As above, whether the obstacle is a moving object can be determined based on a discrepancy between the detected state of the obstacle which is estimated by the detected state estimation section 16 and the real detected state of the obstacle irrespective of whether the vehicle is at a stop or moving. Thus, with the configuration of the first embodiment, it is possible to determine whether the obstacle detected by the obstacle sensor is a moving object irrespective of whether the vehicle is traveling or at a stop.

In addition, the configuration of the first embodiment uses the obstacle detectability or the distance to object as the detected state for determining the discrepancy. Even a low-cost ultrasonic sensor having a resolution lower than that of a laser radar or the like and having difficulty in detecting even an azimuth direction in a detection range allows whether the obstacle detected by the obstacle sensor is a moving object to be determined irrespective of whether the vehicle is traveling or at a stop.

Even when the obstacle is located within the detection range of an ultrasonic sensor such as the first ultrasonic sensor 2a or the second ultrasonic sensor 2b, when the obstacle plane is not facing the installed position of the ultrasonic sensor, the reflected wave of the search wave from the ultrasonic sensor which is reflected by the obstacle plane is not received by the ultrasonic sensor so that the obstacle is not detected. In such a case, even when the obstacle is located within the detection range of the ultrasonic sensor as has been estimated by the detected state estimation section 16, it is actually determined that the obstacle is non-detectable. At this time, when it is determined that the obstacle is a moving object on the assumption that there is a discrepancy between the detected state of the obstacle which is estimated by the detected state estimation section 16 and the real detected state of the obstacle, it is erroneously determined that a stationary object is a moving object.

By contrast, with the configuration of the first embodiment, when the obstacle plane of the obstacle estimated to be detectable by the ultrasonic sensor is not facing the installed position of the ultrasonic sensor, even though the obstacle cannot actually be detected by the ultrasonic sensor, it is not determined that the obstacle is a moving object. This can reduce the possibility of erroneously determining that a stationary object is a moving object.

(First Modification)

The embodiment described above shows the configuration in which the first and second ultrasonic sensors 2a and 2b each as the obstacle sensor which detects an obstacle are mounted on the side surface of the vehicle to detect an obstacle present laterally to the vehicle. However, the configuration is not necessarily limited thereto. The configuration may be such that the obstacle sensor is mounted on a portion other than the side surface of the vehicle to detect an obstacle present in a direction other than a direction lateral to the vehicle.

(Second Modification)

The embodiments show the configuration using the plurality of obstacle sensors which detect an obstacle. However, the configuration is not necessarily limited thereto. For example, a configuration using only one obstacle sensor may be used (hereinafter referred to as a second modification). The following will describe the second modification. In the following description, members having the same functions as those of the members in the drawings used to describe the foregoing embodiments are designated by the same reference numerals and a description thereof is omitted.

A drive assist system 200 in the second modification is the same as the drive assist system 100 in the first embodiment except that only one obstacle sensor is provided and an object determining apparatus 1a is used instead of the object determining apparatus 1.

<Schematic Configuration of Drive Assist System 200>

Using FIG. 10, the drive assist system 200 in the second modification will be described. The drive assist system 200 is mounted in a vehicle and includes the object determining apparatus 1a, a first ultrasonic sensor 2a, the wheel speed sensor 3, and the steering angle sensor 4, as in FIG. 10.

<Detailed Configuration of Object Determining Apparatus 1a>

Figure 10:
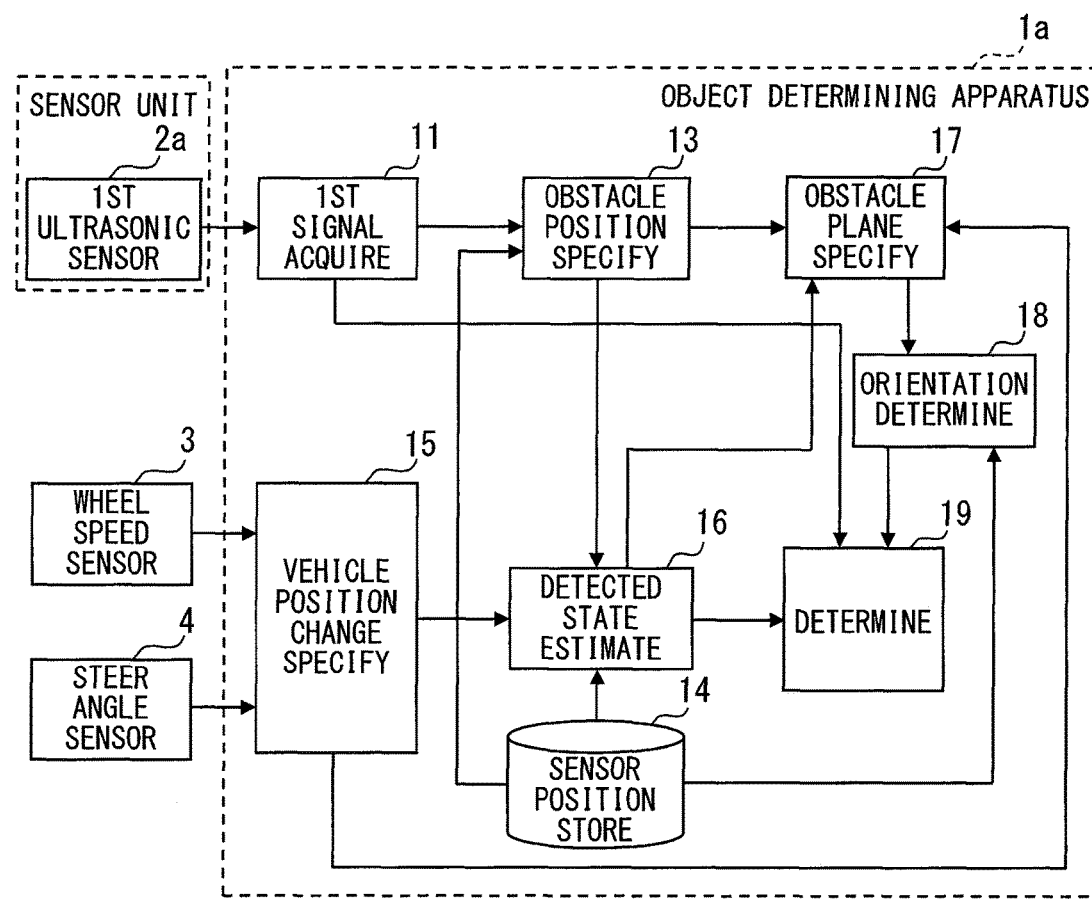
FIG. 10 is a block diagram illustrating an example of a schematic configuration of a drive assist system according to a second modification.

As in FIG. 10, the object determining apparatus 1a includes the first signal acquisition section 11, the obstacle position specification section 13, the sensor position storing element 14, the vehicle position change specification section 15, the detected state estimation section 16, the obstacle plane specification section 17, the orientation determination section 18, and the determination section 19.

The object determining apparatus 1a is the same as the object determining apparatus 1 except that the second signal acquisition section 12 is not provided. An obstacle position retaining process in the object determining apparatus 1a may appropriately have a configuration in which S5 to S8 in the flowchart in FIG. 4 described above are omitted. An object determining process in the object determining apparatus 1a may appropriately have a configuration in which S25 and S26 in the flowchart in FIG. 5 described above are omitted and the process moves to S27 when NO is given in S23 or when S24 is ended.

(Summary of Second Modification)

With the configuration of the second modification, when the vehicle is at a stop, the detected state such as the obstacle detectability or the distance to obstacle when the obstacle is detected again by the first ultrasonic sensor 2a that has temporarily detected the obstacle is estimated. When there is a discrepancy between the estimated detected state and a real detected state, it can be determined that the obstacle is a moving object. Even when the vehicle is moving, if the vehicle passes through the same place twice, the detected state such as the obstacle detectability or the distance to obstacle when the obstacle is detected again by the first ultrasonic sensor 2a that has temporarily detected the obstacle is estimated. When there is a discrepancy between the estimated detected state and a real detected state, it can be determined that the obstacle is a moving object. Thus, irrespective of whether the vehicle is traveling or at a stop, it is possible to determine whether the obstacle detected by the first ultrasonic sensor 2a is a moving object.

The second modification shows the configuration including the only one first ultrasonic sensor 2a as the obstacle sensor. However, a configuration including the only one second ultrasonic sensor 2b as the obstacle sensor may be used. In the first embodiment, the ultrasonic sensor unit includes at least the first and second ultrasonic sensors 2a and 2b. However, in the second modification, the ultrasonic sensor unit is assumed to include either the first ultrasonic sensor 2a or the second ultrasonic sensor 2b.

(Third Modification)

The embodiments show the configuration using an ultrasonic sensor such as the first ultrasonic sensor 2a or the second ultrasonic sensor 2b as the obstacle sensor which detects an obstacle. However, the configuration is not necessarily limited thereto. The configuration may use another obstacle sensor other than an ultrasonic sensor as long as the obstacle sensor allows the position of an obstacle to be specified. The configuration may use an obstacle sensor which detects an obstacle or a distance to an obstacle by receiving a reflected wave of a transmitted search wave, such as a laser radar and a millimeter-wave radar.

(Fourth Modification)

The first embodiment shows the configuration in which, even if there is a discrepancy between the detected state of the obstacle which is estimated by the detected state estimation section 16 and a real detected state, when the orientation determination section 18 determines that the obstacle plane is not facing the installed position of the first or second ultrasonic sensor 2a or 2b, the determination section 19 does not determine that the obstacle is a moving object. However, the configuration is not necessarily limited thereto. The object determining apparatus 1 or 1a includes neither the obstacle plane specification section 17 nor the orientation determination section 18.

In this case, the configuration may use, as an obstacle sensor which detects an obstacle, a stereo camera or the like in addition to an obstacle sensor which detects an obstacle or a distance to the obstacle by receiving a reflected wave of a transmitted search wave, such as a laser radar or a millimeter-wave radar.

(Fifth Modification)

The embodiments show the configuration which specifies the obstacle position in the X-Y coordinate system using the transient vehicle position as the origin and updates the obstacle position in the X-Y coordinate system in response to the movement of the vehicle. However, the configuration is not necessarily limited thereto. The configuration may sequentially specify the object position in the X-Y coordinate system using the vehicle position at a certain time as the origin based on the position of the obstacle relative to the vehicle which is specified by the obstacle position specification section 13 and the vehicle position change during a period from the certain time to the current time which is specified by the vehicle position change specification section 15.

(Sixth Modification)

The embodiments show the configuration which uses the distance to obstacle as the detected state of the obstacle. However, the configuration is not necessarily limited thereto. The configuration may use the obstacle position relative to the vehicle as the detected state when an obstacle sensor which can also detect the position of the obstacle relative to the vehicle, such as a laser radar which can detect an azimuth direction in addition to the distance to obstacle by performing, e.g., sweeping irradiation with a low-directionality laser beam.

(Seventh Modification)

The embodiments show the configuration which specifies the vehicle position change based on a change in the steering angle of the vehicle and the travel distance. However, the configuration is not necessarily limited thereto. The configuration may specify the vehicle position change based on changes in the steering angle and speed of the vehicle, or a yaw rate of the vehicle.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. An in-vehicle object determining apparatus mounted in a vehicle to operate in association with an obstacle sensor unit that receives a reflected wave of a search wave transmitted from the obstacle sensor unit to sequentially detect presence of an obstacle around the vehicle and a distance to the obstacle, the in-vehicle object determining apparatus comprising:
   a determination section that determines whether an obstacle detected by the obstacle sensor unit is a moving object;
   an obstacle position specification section that specifies a vehicle-relative position of the obstacle detected by the obstacle sensor unit, the vehicle-relative position of the obstacle being a position of the obstacle relative to the vehicle;
   a sensor position storing element that stores a sensor position as a position of the obstacle sensor unit relative to the vehicle;
   a vehicle position change specification section that specifies a vehicle position change that is a change in a position of the vehicle;
   a detected state estimation section that calculates,
      based on (i) the vehicle-relative position of the obstacle specified by the obstacle position specification section, (ii) the sensor position stored in the sensor position storing element, and (iii) the vehicle position change specified by the vehicle position change specification section, the vehicle position change being during a period from a first time when the obstacle is detected by the obstacle sensor unit to a second time after a lapse of a predetermined time period from the first time,
      an estimated detected state as a detected state of the obstacle estimated to be detected by the obstacle sensor unit at the second time on condition that the obstacle is assumed to be under stationary state,
   an obstacle plane specification section that specifies a plane of the obstacle relative to the vehicle at the second time
      based on (i) the distance to the obstacle which is sequentially detected by the obstacle sensor unit, (ii) the sensor position stored in the sensor position storing element, and (iii) the vehicle position change specified by the vehicle position change specification section during the period from the first time when the obstacle is detected by the obstacle sensor unit to the second time; and
   an orientation determination section that determines whether the plane of the obstacle is facing the sensor position at the second time based on the plane of the obstacle specified by the obstacle plane specification section and the sensor position stored in the sensor position storing element,
   wherein the determination section determines that the obstacle is a moving object based on a discrepancy between the estimated detected state of the obstacle estimated to be detected at the second time by the obstacle sensor unit and a real detected state of the obstacle, the real detected state of the obstacle being actually detected by the obstacle sensor unit at the second time, and
   wherein, even though a discrepancy is present between the estimated detected state of the obstacle estimated to be detected at the second time by the obstacle sensor unit and the real detected state of the obstacle actually detected at the second time by the obstacle sensor unit, when the orientation determination section determines that the plane of the obstacle is not facing the sensor position of the obstacle sensor unit at the second time, the determination section does not determine that the obstacle is a moving object.

2. The in-vehicle object determining apparatus according to claim 1,
   wherein each of the estimated detected state and the real detected state is at least either a detectability of the obstacle or a distance to the obstacle.

3. The in-vehicle object determining apparatus according to claim 1,
   wherein:
   the obstacle sensor unit includes a first obstacle sensor and a second obstacle sensor, which have mutually different detection ranges;
   the detected state estimation section calculates an estimated detected state of an obstacle, the estimated detected state being estimated to be detected at the second time by the second obstacle sensor different from the first obstacle sensor, the obstacle being detected at the first time by the first obstacle sensor and used by the obstacle position specification section specifying the vehicle-relative position of the obstacle; and
   the determination section determines that the obstacle is a moving object based on a discrepancy between the estimated detected state of the obstacle estimated to be detected at the second time by the second obstacle sensor and the real detected state of the obstacle actually detected at the second time by the second obstacle sensor.

4. The in-vehicle object determining apparatus according to claim 3,
wherein:
the detected state estimation section also calculates an estimated detected state of an obstacle estimated to be detected at the second time also by the first obstacle sensor, the obstacle being detected at the first time by the first obstacle sensor and used by the obstacle position specification section specifying the vehicle-relative position of the obstacle; and
the determination section determines that the obstacle is a moving object based on a discrepancy between the estimated detected state of the obstacle estimated to be detected at the second time by the first obstacle sensor and the real detected state of the obstacle actually detected at the second time by the first obstacle sensor.

5. The in-vehicle object determining apparatus according to claim 3,
wherein:
when the vehicle is at a stop, the detected state estimation section calculates an estimated detected state of an obstacle estimated to be detected at the second time again by the first obstacle sensor, the object being detected at the first time by the first obstacle sensor and used by the obstacle position specification section specifying the vehicle-relative position of the obstacle; and
the determination section determines that the obstacle is a moving object based on a discrepancy between the estimated detected state of the obstacle estimated to be detected at the second time by the first obstacle sensor and the real detected state of the obstacle actually detected at the second time by the first obstacle sensor.

6. The in-vehicle object determining apparatus according to claim 1,
wherein:
the obstacle sensor unit is an obstacle sensor;
the detected state estimation section calculates an estimated detected state of an obstacle estimated to be detected at the second time again by the obstacle sensor, the obstacle being detected at the first time by the obstacle sensor and used by the obstacle position specification section specifying the vehicle-relative position of the obstacle; and
the determination section determines that the obstacle is a moving object based on a discrepancy between the estimated detected state of the obstacle estimated to be detected at the second time by the obstacle sensor and the real detected state of the obstacle actually detected at the second time by the obstacle sensor.

7. The in-vehicle object determining apparatus according to claim 1,
wherein the obstacle sensor unit detects an obstacle in a lateral region relative to the vehicle.

8. The in-vehicle object determining apparatus according to claim 1,
wherein the obstacle sensor unit is an ultrasonic sensor.

* * * * *